US006204467B1

United States Patent
Greenholtz, Jr. et al.

(10) Patent No.: US 6,204,467 B1
(45) Date of Patent: Mar. 20, 2001

(54) METHOD AND APPARATUS FOR RESISTIVE WELDING

(75) Inventors: Ben Edward Greenholtz, Jr.; Frank Joseph Ourednik; Ken George Englebry; Donald Frederick Maatz, Jr., all of Avon Lake, OH (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/047,081

(22) Filed: Mar. 24, 1998

(51) Int. Cl.[7] ............................ B23K 11/00; B23K 11/10; B23K 11/31
(52) U.S. Cl. ............................ 219/86.25; 219/86.61; 228/106
(58) Field of Search .......................... 219/86.25, 86.33, 219/86.61, 119; 228/106, 5.5

(56) References Cited

U.S. PATENT DOCUMENTS

| 2,266,424 | * | 12/1941 | Humphrey | 219/119 |
|---|---|---|---|---|
| 3,110,961 | * | 11/1963 | Melill et al. | 228/181 |
| 3,235,704 | * | 2/1966 | Rockwell | 219/119 |
| 3,238,352 | * | 3/1966 | Kollmann et al. | 219/119 |
| 3,632,958 | * | 1/1972 | Width | 219/119 X |
| 3,731,046 |   | 5/1973 | Brems . | |
| 3,774,834 | * | 11/1973 | Holler et al. | 228/5.5 |
| 4,484,056 | * | 11/1984 | Rossell | 219/86.51 |
| 4,549,457 |   | 10/1985 | Bloch et al. . | |
| 4,762,976 | * | 8/1988 | Miller et al. | 219/119 |
| 4,803,329 | * | 2/1989 | Nakata et al. | 219/86.25 |
| 4,896,811 | * | 1/1990 | Dunn et al. | 228/5.5 |

FOREIGN PATENT DOCUMENTS

| 3314646 | * | 10/1984 | (DE) | 219/86.33 |
|---|---|---|---|---|
| 0227543 | * | 7/1987 | (EP) | 219/119 |
| 1018826 | * | 5/1983 | (SU) | 219/86.25 |
| 1825695 | * | 7/1993 | (SU) | 219/86.25 |

\* cited by examiner

Primary Examiner—Samuel M. Heinrich
(74) Attorney, Agent, or Firm—Damian Porcari

(57) ABSTRACT

A method and apparatus for resistive welding using an electrode holder having an elongated cylinder. The cylinder has a closed end and an open end. The cylinder contains a moveable piston. The piston includes a compression surface and an end adapted to retain a welding electrode. A compressible biasing member is positioned within the cylinder and is compressed between the closed end and the compression surface. An electrode is attached to the holder. The holder is preferably used as a lower electrode holder opposite a moveable upper cylinder. A work piece is placed between the upper cylinder and lower holder. The upper cylinder is extended and applies a force to the holder through the electrodes and work piece. The force causes the biasing member to compress within the lower elongated cylinder and apply a counter force against the lower surface electrode.

2 Claims, 2 Drawing Sheets

METHOD AND APPARATUS FOR RESISTIVE WELDING

BACKGROUND OF THE INVENTION

1. Field of the Invention

The present invention is directed to a holder for a resistive welding electrode. More specifically, the present invention is directed to a holder having a compressible biasing member that provides a counter force.

2. Description of the Related Arts

Modern metal fabrication facilities utilized resistive welding equipment. A resistive welder contacts opposite surfaces of a work piece with welding electrodes. An electric current applied to the electrodes causes the work piece to weld. Hundreds of resistive welders are used by an automotive assembly facilities to join the various body components. The welders require a measured application of force between the electrodes and the work piece. If the applied force is too high, the work piece or electrodes may be damaged. If the applied force is too low, the resulting weld may be weakened.

Most resistive welding equipment is constructed of opposed pneumatically or hydraulically operated cylinders. Electrodes are attached to each cylinder and contact the work piece from opposite sides. The cylinders are generally positioned horizontally, whereby both the upper and lower cylinders are moved into contact with the work piece. Moveable cylinders are used to provide an opening for the work piece and to apply a known force to the electrodes.

The welding operation used to produce automotive bodies requires thousands of welds. Each welder is operated many times per day. Each use of the welder causes a small amount of wear to the electrode. As the electrode wears, the cylinder must travel a greater distance to apply the desired force. Hence, it has been necessary to use opposed cylinders that trap the work piece. If one electrode were mounted to a stationary surface, it would lose contact with the work piece as the electrode wore, or it would cause an unwanted deflection in the work piece as the work piece is forced into contact with the worn electrode.

When the work piece to be welded is a vehicle body, it is desirable that the welding operation not impart any distortion or damage to the joined metal members. Consequently, it is desirable to attach the welding electrodes to holders that apply force to both sides of the work piece.

As previously described, most current automotive assembly operations utilize opposed moveable cylinders operated by air or oil. The cylinders require numerous electrical and fluid connections. These connections occupy floor space in the vicinity of the vehicle body and prevent access to the vehicle by people and equipment. Because the electrodes require periodic replacement, it is desirable to maintain the area near the welder accessible to people and equipment. Additionally, when the cylinders are mounted in a vertical orientation, the welding operation causes sparks and hot metal debris to fall on the lower cylinder and connections. These debris can be trapped by the exposed cylinders and may damage the connections.

It is desirable to replace at least one of these electrode holders with a self-contained holder that does not require any external connection for motion. The holder would be accessible to people and equipment and would not be as susceptible to damage by falling welding debris.

It is known to include a biasing member in combination with a moveable cylinder as shown in U.S. Pat. No. 3,731,046. The electrode holder illustrated in this patent uses elastic bushings that provide a very small follow-up force during the welding process while also providing electrical isolation between the electrode and the moveable cylinder. This device still requires a moveable cylinder to move the electrode holder into position because the follow-up force described in this patent occurs when the metal work piece becomes molten. The patent describes a follow-up movement occurring in $\frac{1}{20}$ of a second during which the metal work piece is molten. The bushing is placed radially between the piston and cylinder wall. The bushings are bonded to both the piston and cylinder wall. The bonding operation makes assembly and repair of the electrode holder very difficult. The present invention is directed to a simpler design that eliminates the need for the moveable cylinder by providing greater electrode travel. The present design may be easily assembled and repaired because it does not use a bushing attached to either the cylinder wall or piston.

One design that utilizes a single moveable cylinder and a force equalizing means is illustrated in U.S. Pat. No. 4,549,457. A moveable cylinder is mounted in a pivoting frame. The frame pivots the tool into position on opposite sides of a work piece. A biasing means attached between the frame and the cylinder apply an equalized force to opposite sides of the work piece. This design is not used as an electrode holder, but rather, as a forming anvil to mechanically join metal pieces. The equalizing means requires that the cylinder and frame be connected and moveable so as to bias the cylinder with respect to the work piece. The equalizing means is a complex spring and cam mechanism that balances the force applied by the cylinder. The electrode holder of the present invention does not require the bulky frame that serves to retain both the cylinder and the anvil (electrodes as used in the present invention) nor the complex equalizing means described.

These deficiencies and problems as well as others are overcome by the present invention.

SUMMARY OF THE INVENTION

The present invention relates to a method and apparatus for resistive welding. More specifically, the apparatus includes a holder for use with a resistive welding electrode. The holder includes an elongated cylinder having a closed end and an open end. The cylinder contains a moveable piston. The piston includes a compression surface and an end adapted to retain a welding electrode. A compressible biasing member is positioned within the cylinder and is compressed between the closed end and the compression surface.

An electrode is attached to the holder. The holder is preferably used as a lower electrode holder opposite a moveable upper cylinder. A work piece is placed between the moveable cylinder and lower holder. The moveable cylinder is extended and applies a force to the holder through the electrodes and work piece. The force causes the biasing member to compress within the lower holder and apply a counter force against the lower surface of the work piece.

The invention is particularly adapted to take advantage of the large number of commercially existing hydraulic cylinder housings, which may be easily converted, to work without the need of external hydraulic connections. The hydraulic connections are eliminated and the internal piston compresses a urethane biasing member to apply a measured counter force to the under surface of the work piece. The elimination of the external connections frees the area near the holder from hydraulic fluid lines or other items that impede access to the lower electrode or that can be damaged from welding debris.

These and other objects, features, and advantages of the present invention will become more readily apparent when viewed in connection with the accompanying drawings wherein like reference numerals correspond to like components.

DETAILED DESCRIPTION OF THE PREFERRED EMBODIMENTS

Figure 1:
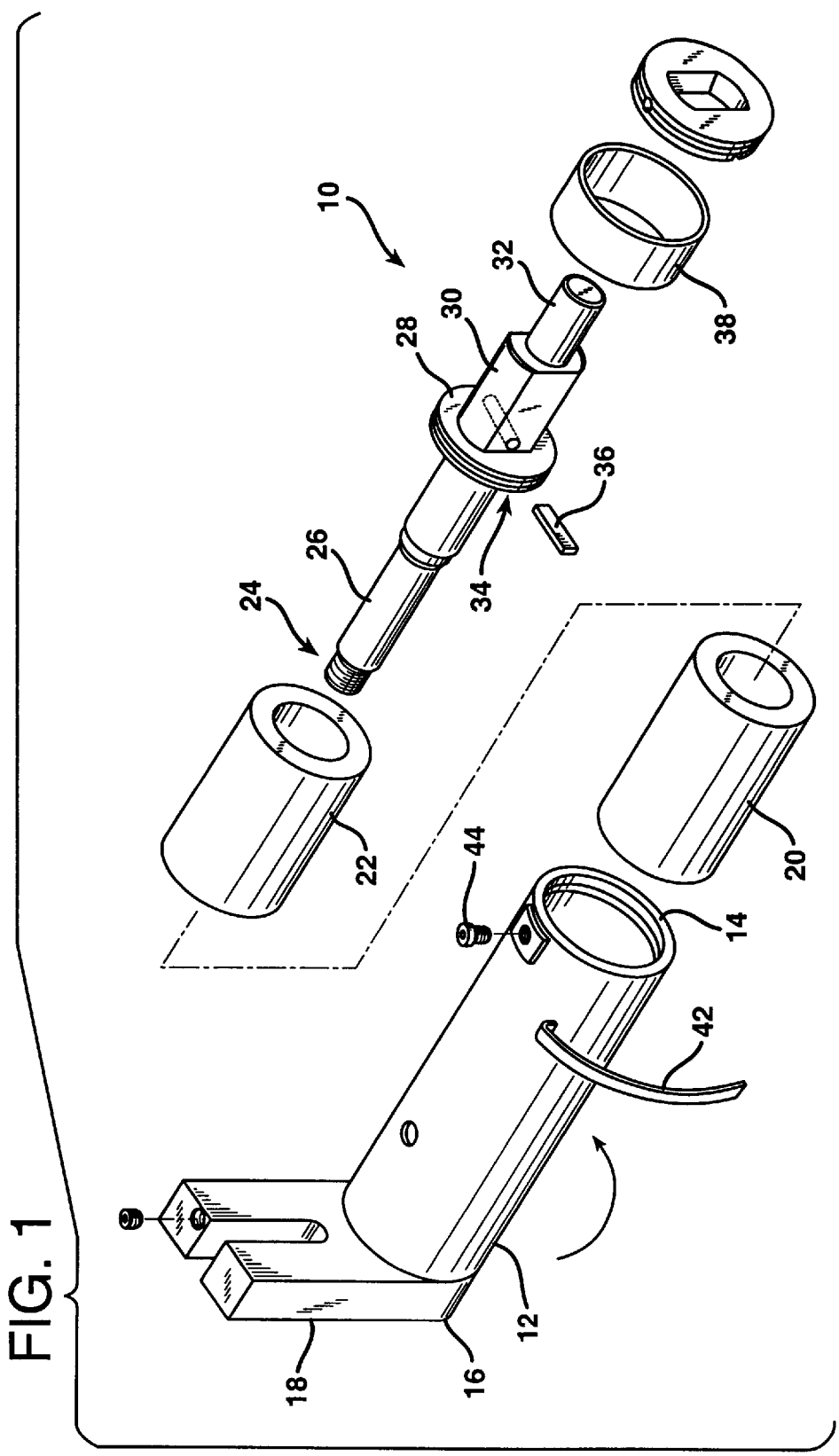
FIG. 1 is an exploded perspective view of the holder.

The present invention will be described through a series of drawings, which illustrate the electrode welder holder claimed. The drawings describe a holder that was fabricated to replace existing hydraulically operated actuators; however, the design may also be used to fabricate a purpose built electrode holder. These purpose-built devices may be manufactured using the same or similar techniques and equipment and are included within the invention described herein.

The following items are a word list of the items described in the drawings and are reproduced to aid in understanding the invention:

10 electrode holder
12 cylinder body
14 open end
16 closed end
18 attachment plate
20 spacer
22 urethane biasing member
24 piston assembly
26 rod
28 piston
30 shaft
32 end
34 compression surface
36 roll pin
38 spacer
40 retaining bushing
42 retaining ring
44 retaining screw
46 moveable cylinder
48 lower electrode
50 upper electrode
52 work piece The invention will be illustrated using existing components of a hydraulic cylinder that were adapted for use with the present invention. This usage allows for easy retrofit in existing facilities. The invention may be used in any orientation, but it is especially preferred as the lower electrode holder for vertically opposed electrodes. Because the electrode holder does not require a moveable actuator, it is less susceptible to damage from welding debris that tends to fall on the lower electrode holder. Additionally, elimination of the hydraulic connections makes operator access to the holder for repair or alignment much simpler and convenient. The elimination of the hydraulic fluid connections also enables to the electrodes to be spaced closer thus enabling more welds on a work piece.

Construction:

An exploded perspective view of an electrode holder 10 is illustrated in FIG. 1. The electrode holder 10 includes a cylinder body 12 having an open end 14 and a closed end 16. The cylinder body 12 has an attachment plate 18 that secures the electrode holder 10 in position. The cylinder body 12 is adapted from a commercially available hydraulic actuator cylinder. The electrode holder 10 is assembled by inserting a spacer 20 within the interior of the cylinder body 12. An annular urethane biasing member 22 is placed adjacent the spacer 20. The biasing member 22 is sized to be constrained within the cylinder body 12. The biasing member 22 is made from a urethane material. Suitable urethane material include #U8 from Page Belting, Urethane Division in Concord, N.H. 03301. Item #U8 is ⅞" ID×1-⅝" OD×2" long. The biasing member 22 is in the shape of an annular ring to permit clearance for the rod 26.

A piston assembly 24 includes a rod 26, a piston 28 and a shaft 30 having a 32. The rod 26 fits within the spacer 20 and the biasing member 22. The piston 28 includes a compression surface 34 that contacts the biasing member 22. A roll pin 36 locks the rod 26, piston 28 and shaft 30 in position. A spacer 38 limits the upward travel of the piston assembly 24.

The piston assembly 24 is inserted within the biasing member 22 and pre-loaded with approximately 650 lbs. of compressive force. As will be more fully described below, the amount of pre-loading is selected to apply an approximately equal force on both surfaces of a work piece during the welding operation. A retaining bushing 40 acts as a closure for the cylinder body 12 and is locked in position by a retaining ring 42 and a retaining screw 44. An electrically insulated welding electrode is attached to the piston end 32 (not shown in this view)

Figure 2:
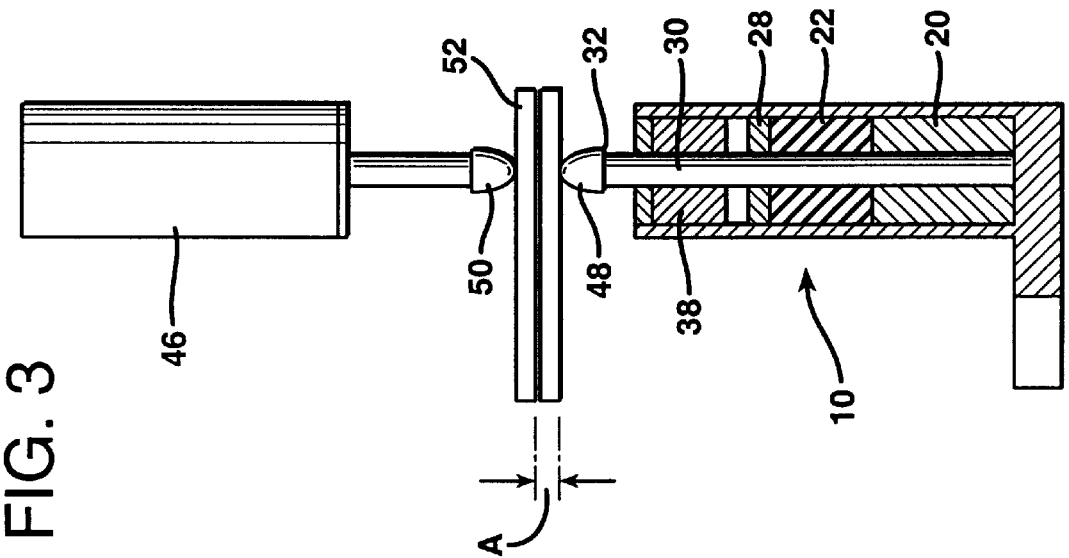
FIG. 2 is a cross-sectional view of the holder installed beneath a hydraulically operated upper holder with a work piece placed therebetween, showing the holder in a free state.
Figure 3:
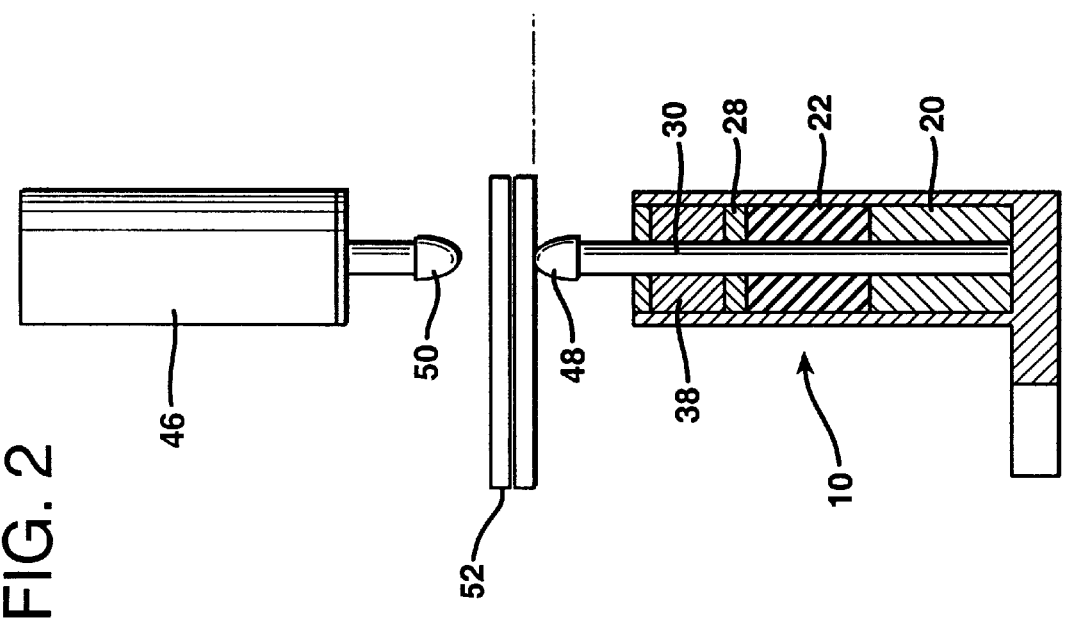
FIG. 3 is a cross-sectional view of the holder illustrated in FIG. 2, showing the holder in a compressed state and applying a counter force.

Method of operation:

The electrode holder 10 of the present invention is intended for usage in combination with a moveable cylinder as illustrated in FIGS. 2 and 3. Because the electrode holder 10 does not require hydraulic or pneumatic fluid connections and is more resistant to welding debris, it is positioned below a moveable cylinder 46. The moveable cylinder 46 may be a pneumatic or hydraulic cylinder having a piston travel of about two inches. When welding sheet metal components having a governing thickness of 0.9 mm to 1.3 mm, the moveable cylinder 46 is regulated to apply approximately 800 lbs. of force. Electrode holder 10 and the cylinder 46 receive electrodes 48, 50. The electrodes 48, 50 are those normally used for resistance spot welding. The electrodes 48, 50 are electrically isolated from the electrode holder 10 and the cylinder 46 and have electrical connections (not shown) for welding.

A metal work piece 52 generally comprising two or more metal members is placed between the electrodes 48, 50 while the cylinder 46 is in a retracted position as shown in FIG. 2. The work piece 52 is retained by locating pins (not shown) to rest on or slightly above the lower electrode 48. The cylinder 46 is moved to an extended position as shown in FIG. 3. The upper electrode 50 contacts the work piece 52 and causes the work piece 52 to apply a force to the lower electrode 48. The lower electrode 48 applies a force to the end 32 and causes the piston 28 to compress the biasing member 22. As the biasing member 22 is compressed, it applies a counter force that urges the piston 28, shaft 30 and end 32 upwards. The biasing member 22 compresses until it applies a counter force equal to the force of the cylinder 46. Because the biasing member is pre-loaded, even a small downward movement of piston 28 causes a relatively large application of counter force.

Applicants found that an applied downward force of 800 lbs. may be counter balanced by a biasing member having a surface area of 0.87 sq. inches moving approximately ⅜ inch when pre-loaded to about 650 lbs. The movement of the work piece 52 is labeled A in the space between FIGS. 2 and 3. This amount of movement does not damage the work piece 52.

Heretofore, stationary electrode holders were thought to be impractical because they caused excessive wear to the electrodes or damage to the work piece as the electrodes wear. A stationary electrode does not apply a counter force and therefore does not properly balance the force needed to provide repeatable welds. The present invention enables the lower electrode 48 to provide an opposed counter force to the moving upper electrode 50. Wear in the electrodes 48, 50 is taken up by the compression of the biasing member 22. The movement A causes the biasing member 22 to compress until it applies a counter force equal to the force of the moveable cylinder 46.

Spacers 20, 38 were used because an existing hydraulic cylinder is retrofit with the urethane biasing member 22. In an original application design, the spacers 20, 38 would not be needed.

While the best modes for carrying out the invention have been described in detail, those familiar with the art to which this invention relates will recognize various alternative designs and embodiments for practicing the invention as defined by the following claims.

What is claimed:

1. A resistance welder comprising:
   a moveable cylinder having a first resistive welding electrode;
   a second cylinder opposing said moveable cylinder, said second cylinder having a closed end and an open end;
   a piston moveable within said cylinder, said piston having an end adapted to retain a second resistive welding electrode and a compression surface; and
   an annular compressible urethane biasing member positioned within said second cylinder and compressible between said closed first end and said piston compression surface, whereby said piston compresses said biasing member when said moveable cylinder is moved to an extended position and said compressed biasing member applies a counter force to said second electrode.

2. A method of resistive welding utilizing a moveable cylinder having a first resistive welding electrode, and a second cylinder having a second electrode opposing the moveable cylinder, said second cylinder having a piston and a compressible biasing member, the method comprising:
   retracting the moveable cylinder;
   placing a work piece between said first and second electrodes;
   extending said moveable cylinder and contacting said work piece with said first electrode and causing said work piece to contact said second electrode;
   said second electrode causing said piston to compress said biasing member, said biasing member comprising an annular compressible urethane biasing member positioned within said second cylinder and compressible between a closed end and a piston compression surface; and
   said biasing member applying a counter force to said second electrode whereby said second electrode and said first electrode apply equal force to both surfaces of said work piece.

* * * * *